No. 780,203. PATENTED JAN. 17, 1905.
J. B. LADD.
CHARGING DEVICE FOR COKE OVENS.
APPLICATION FILED FEB. 5, 1903.
2 SHEETS—SHEET 1.
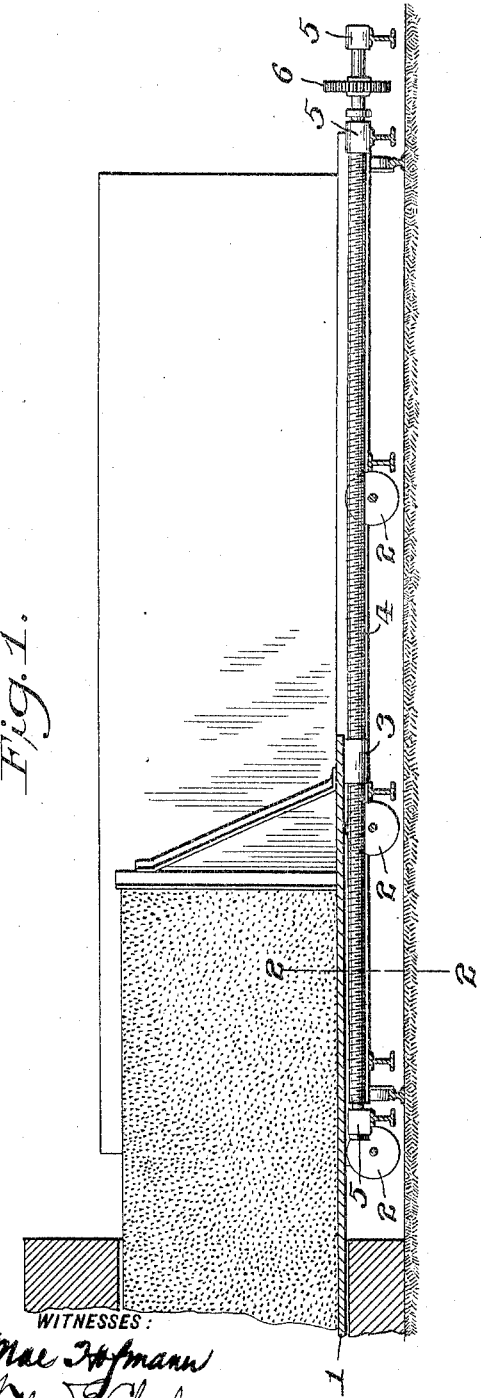
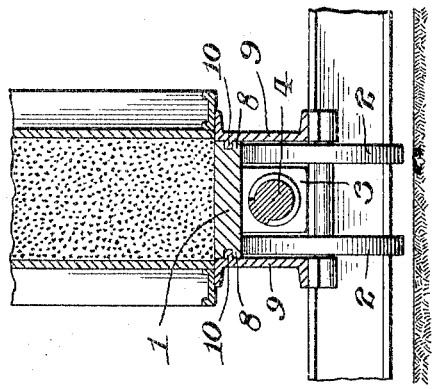
WITNESSES:
INVENTOR
James B. Ladd
BY
ATTORNEY.

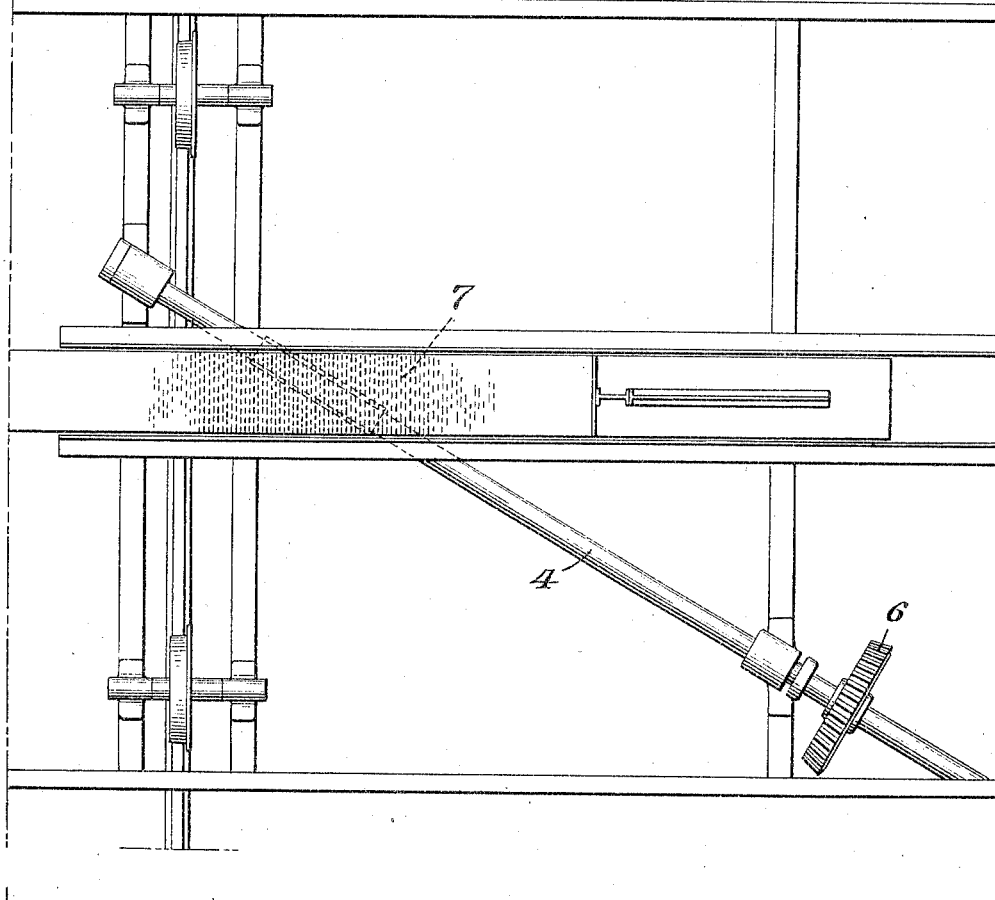
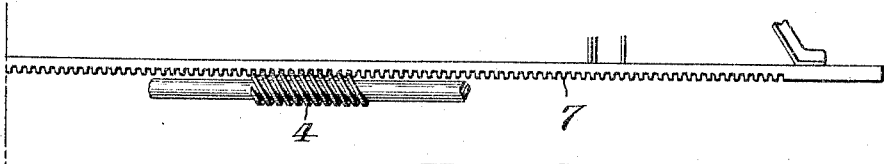

No. 780,203. Patented January 17, 1905.

UNITED STATES PATENT OFFICE.

JAMES B. LADD, OF WAYNE, PENNSYLVANIA.

CHARGING DEVICE FOR COKE-OVENS.

SPECIFICATION forming part of Letters Patent No. 780,203, dated January 17, 1905.

Application filed February 5, 1903. Serial No. 141,962.

*To all whom it may concern:*

Be it known that I, JAMES B. LADD, a citizen of the United States, residing at Wayne, Delaware county, and State of Pennsylvania, have invented a new and useful Charging Device for Coke-Ovens, of which the following is a specification.

My invention relates to coke-oven-charging machines in which the charge of coal after it has been formed into a cake is carried into the oven by the longitudinal motion of a carrier called a "peel," which generally serves also as a bottom for the box in which the cake is formed.

The object of my invention is to afford improved means for moving the peel into the oven smoothly—that is, without jar or vibration—so that the cake of coal will not be injured thereby.

As ordinarily constructed the peel on machines of this character is moved by means of a spur-pinion which engages in a rack connected with the under side of the peel, with a result that its motion is generally accompanied with considerable vibration, which tends to crack and disintegrate the cake. Inasmuch as the bonding qualities of the coal are ordinarily barely sufficient to permit of its being formed into cakes which will stand alone, the height of which is usually relatively greater than the width, it is of great importance that the operation of moving such cakes into the oven shall be performed smoothly and without shock or vibration. It is also to be observed that in the rack-and-pinion construction above referred to the rack must pass into the oven and is thereby subjected to heat and dirt, with the result that its teeth become uneven, which causes uneven coöperation between them and the pinion and adds to the jar or vibration of the peel, and a further result of this unevenness is that the teeth of said rack and pinion wear rapidly. Where a screw drive is used, as shown in the accompanying drawings, especially in Figure 1, the threaded lug being placed at the rear end of the peel does not pass into the oven and is therefore not subjected to heat and other disadvantages resulting therefrom.

In the accompanying drawings, Fig. 1 is a side elevation, in part section, of a device showing my mechanism. Fig. 2 is a vertical cross-section, slightly enlarged, on line 2 2 of Fig. 1. Fig. 3 is a plan view of a modification of my device, and Fig. 4 is a detail of same.

Similar numerals refer to similar parts throughout the several views.

Referring to Figs. 1 and 2, the peel 1 is shown supported, as usual, on rollers 2 and has attached to its under side a threaded lug 3, through which passes a screw or threaded shaft 4, which is supported and is rotatable in the stationary bearings 5. This threaded shaft 4 is so mounted in the stationary bearings 5 that it will operate in tension rather than in thrust, which permits for a given length a smaller diameter than would otherwise be possible, without the employment of supporting-bearings intermediate the end bearings. This is accomplished by allowing a slight end play in the bearings to cause the screw to always pull and never push. From the construction shown it is evident that when the screw or threaded shaft 4 is rotated the threaded lug 3 and the peel 1, to which it is secured, will be caused to travel longitudinally. Power for rotating this screw or threaded shaft 4 may be transmitted to it through the spur-gear 6 or other suitable means.

A modification of my device is shown in Fig. 4, in which there is substituted for the threaded lug or nut 3 the rack 7. The threaded shaft is arranged diagonally with the longitudinal extension of the peel, so that the threads thereof will coöperate with the rack, causing the longitudinal movement of the peel.

With such a construction as last above described or the ordinary construction of pinion-and-rack means for moving the peel it is advantageous to have some means for guiding the peel, especially for preventing vertical movement of the same. The common practice prior to my invention for preventing this vertical movement—due, for instance, to the rack riding upon the pinion—has been to locate the sides of the box in which the coal-cake is packed superimposing the outer edges of the peel, with the result that the cake of coal cannot be formed the entire width of the peel. From this it results that the door of the coke-oven being necessarily large enough to admit the peel is consequently larger than is necessary to admit the cake of coal, and hence there is waste space between the coal-cake and the sides of the door. Economy in utilizing the maximum dimensions of oven-door for the size of the coal-cake has become of extreme importance in view of the great masses of coal constituting single charges in modern coke-oven practice. This economy is secured by my improved structure above described, and shown in the drawings. So far as I know, my device is the first to utilize the full width of the peel for the coal-cake, and thereby minimize waste space between the coal-cake and the oven-door. For this reason I have provided a solid peel 1, as shown in cross-section in Fig. 2, having longitudinal grooves or channels 8 therein, leaving the top surface of the peel of full width and unbroken. I have provided, in connection with the framework or supporting structure 9, guides 10, which coöperate with the grooves or channels 8 in the peel in guiding it and preventing said vertical movement.

The form of peel above described possesses a threefold advantage—maximum strength for given thickness, simplicity of construction, and economy of space between dimensions in coke-oven door and width of coal-cake. The method of its construction is greatly simplified over that of forms now in common use. It may be made of a single solid plate of steel with channels plowed in its longitudinal edges. By being provided with these grooves it permits of the cake of coal extending the entire width of the peel, which means that the maximum size of cake may be introduced into the oven.

I do not wish to be confined in my invention to the specific construction shown in the accompanying drawings, but may vary the arrangement or position of the screw and the form of device connected with the peel for coöperating with the thread of the screw without departing from the scope of my invention.

What I claim is—

1. In a coke-oven-charging machine, the combination of a longitudinally-movable peel, a threaded shaft rotatably mounted diagonally across the longitudinal extension of the peel, and means connected with the peel for coöperating with the shaft to cause the movement of the peel upon the rotation of the shaft.

2. In a coke-oven-charging machine, the combination of a longitudinally-movable peel provided with a rack, a threaded shaft rotatably mounted for coöperation therewith, the angular position of said shaft with respect to the longitudinal extension of the peel being such as to bring the pitch of the thread in operative relationship with the rack.

3. In a coke-oven-charging machine, the combination of a peel and screw means acting in tension for causing the movement of the same.

4. In a coke-oven-charging machine, the combination of a peel, a threaded shaft and means for rotating the same, means connected with the peel for coöperating with the shaft to cause the movement of the peel upon the rotation of the shaft, bearings for the shaft so arranged that the shaft may act in tension.

5. In a coke-oven-charging machine, the combination of a peel, a threaded shaft rotatable in stationary bearings so arranged that the shaft will act in tension and not in thrust, and means connected with the peel for coöperating with the threaded shaft to cause the movement of the peel upon the rotation of the shaft.

6. In a coke-oven-charging device, the combination of a peel, a threaded shaft having a continuous screw-thread, means for rotating the same, means connected with the peel for coöperating with the shaft to cause the movement of the peel upon the rotation of the shaft, and bearings for the shaft so arranged that it may act in tension.

JAMES B. LADD.

Witnesses:
WILLIAM E. CHAPMAN,
MAE HOFMANN.